(12) United States Patent
Kishida

(10) Patent No.: US 12,512,861 B2
(45) Date of Patent: Dec. 30, 2025

(54) RADIO COMMUNICATION APPARATUS, METHOD, AND COMPUTER READABLE MEDIUM

(71) Applicant: NEC Corporation, Tokyo (JP)

(72) Inventor: Tomoki Kishida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 380 days.

(21) Appl. No.: 18/113,326

(22) Filed: Feb. 23, 2023

(65) Prior Publication Data

US 2023/0327687 A1 Oct. 12, 2023

(30) Foreign Application Priority Data

Apr. 8, 2022 (JP) .................................. 2022-064392

(51) Int. Cl.
 *H04B 1/52* (2015.01)
 *H04B 1/00* (2006.01)
 *H04B 1/04* (2006.01)

(52) U.S. Cl.
 CPC ......... *H04B 1/0078* (2013.01); *H04B 1/0458* (2013.01); *H04B 2001/0408* (2013.01)

(58) Field of Classification Search
 CPC ................ H04B 1/0078; H04B 1/0458; H04B 2001/0408

USPC ....................................................... 455/552.1
See application file for complete search history.

(56) References Cited

U.S. PATENT DOCUMENTS

| 2005/0047521 | A1* | 3/2005 | Ishikawa | H03F 1/3247 |
| | | | | 375/296 |
| 2010/0156330 | A1* | 6/2010 | Inoue | H02P 25/024 |
| | | | | 318/400.02 |
| 2012/0147991 | A1* | 6/2012 | Matsubara | H04L 27/368 |
| | | | | 375/296 |
| 2016/0268972 | A1* | 9/2016 | Fujimura | H03F 1/0205 |
| 2018/0115288 | A1* | 4/2018 | Konno | H03F 1/3247 |
| 2021/0399692 | A1* | 12/2021 | Chidurala | H03F 3/195 |

FOREIGN PATENT DOCUMENTS

WO 2008/155819 A1 12/2008

* cited by examiner

*Primary Examiner* — Tanmay K Shah
(74) *Attorney, Agent, or Firm* — Sughrue Mion, PLLC

(57) ABSTRACT

A radio communication apparatus including a power amplifier configured to amplify power of a signal and output the signal having the amplified power, and a distortion compensation unit configured to compensate for a distortion caused by a nonlinear characteristic of the power amplifier based on a length of an immediately preceding signal Off time is provided.

6 Claims, 11 Drawing Sheets

| TIME t | | COMPENSATION $\alpha$ |
|---|---|---|
| | t0 | 1.0 |
| | t1 | 1.0 |
| | t1-1 | 0.8 |
| | t1-2 | 0.6 |
| | t1-3 | 0.4 |
| | t1-4 | 0.2 |
| | t2 | 0.0 |
| | t3 | 0.0 |

Fig. 8

RADIO COMMUNICATION APPARATUS, METHOD, AND COMPUTER READABLE MEDIUM

INCORPORATION BY REFERENCE

This application is based upon and claims the benefit of priority from Japanese patent application No. 2022-064392, filed on Apr. 8, 2022, the disclosure of which is incorporated herein in its entirety by reference.

TECHNICAL FIELD

The present disclosure relates to a radio communication apparatus, a method, and a program.

BACKGROUND ART

In mobile communications, two transmission and reception methods i.e., frequency division duplex (FDD: Frequency Division Duplex) in which transmission and reception are simultaneously performed, and time division duplex (TDD: Time Division Duplex) in which transmission and reception are performed in a time-division manner in order to improve the efficiency of use of frequencies, have been adopted. In the case of the TDD method, the transmission time and the reception time are switched at a high speed. In general, in the reception time, the power amplifier is stopped in order to reduce the power consumption and to prevent any power from unnecessarily leaking from the apparatus during the reception time (in order to achieve the standard in regard to the leakage power attenuation ratio upon power-off). Therefore, depending on the time response property of the power amplifier, the nonlinear characteristics (AM (Amplitude Modulation)-AM characteristic and AM-PM (Phase Modulation) characteristic) of the power amplifier immediately after transmission is started may differ from those at other timings.

Meanwhile, as a distortion compensation technology widely used in radio base station apparatuses for mobile communications, there is a digital predistortion (DPD: Digital Predistortion) technology. Distortion compensation performed by the digital predistortion technology is to compensate for a nonlinear distortion occurring in a power amplifier. Further, as a technology related to the above-described technology, International Patent Publication No. WO2008/155819 discloses a technology in which multi-level phase modulation information is detected and a LUT (Look up Table) is switched between the first part of a frame and the second (latter) part of the frame based on the detected phase modulation information.

SUMMARY

However, in the related technology, in the case where nonlinear characteristics immediately after a signal is turned on (immediately after a signal is switched from Off to On) significantly differ from average nonlinear characteristics which are to be compensated by the DPD, and hence On and Off timings of the signal dynamically change, for example, in the case of a power amplifier using a gallium-nitride (GaN) transistor, the nonlinear characteristics immediately after the signal is turned on (immediately after the start of radio transmission) cannot be properly compensated for. Therefore, radio characteristics, such as ACLR (Adjacent Channel Leakage Ratio; adjacent channel leakage power attenuation ratio) and EVM (Error Vector Magnitude; modulation accuracy), immediately after the start of transmission deteriorate.

In view of the above-described problem, an example of an object of the present disclosure is to provide a technology by which nonlinear characteristics of a power amplifier can be properly compensated for.

In a first aspect of the present disclosure, the following radio communication apparatus is provided. That is, the radio communication apparatus includes:

a power amplifier configured to amplify power of a signal and output the signal having the amplified power; and a distortion compensation unit configured to compensate for a distortion caused by a nonlinear characteristic of the power amplifier based on a length of an immediately preceding signal Off time.

Further, in a second aspect of the present disclosure, the following method is provided. That is, the method includes compensating, by a radio communication apparatus, for a distortion caused by a nonlinear characteristic of a power amplifier based on a length of an immediately preceding signal Off time, the power amplifier being configured to amplify power of a signal and output the signal having the amplified power.

Further, in a third aspect of the present disclosure, the following program is provided. That is, the program is adapted to cause a computer to perform a process for compensating for a distortion caused by a nonlinear characteristic of a power amplifier based on a length of an immediately preceding signal Off time, the power amplifier being configured to amplify power of a signal and output the signal having the amplified power.

BRIEF DESCRIPTION OF DRAWINGS

The above and other aspects, features, and advantages of the present disclosure will become more apparent from the following description of certain example embodiments when taken in conjunction with the accompanying drawings, in which:

FIG. 8 shows an example of changes in a correction coefficient α over time according to an example embodiment;

EXAMPLE EMBODIMENT

The principle of the present disclosure will be described with reference to several illustrative example embodiments. It should be understood that these example embodiments are described only for an illustrative purpose and will assist those skilled in the art in understanding and carrying out the present disclosure without suggesting any limitations in regard to the scope of the disclosure. Disclosures described in this specification can also be implemented in a variety of ways other than those described below.

In the following description and the claims, unless otherwise defined, all technical and scientific terms used in this specification have the same meanings as those generally understood by those skilled in the technical field to which the present disclosure belongs.

An example embodiment according to the present disclosure will be described hereinafter with reference to the drawings.

<Configuration>

Figure 1:
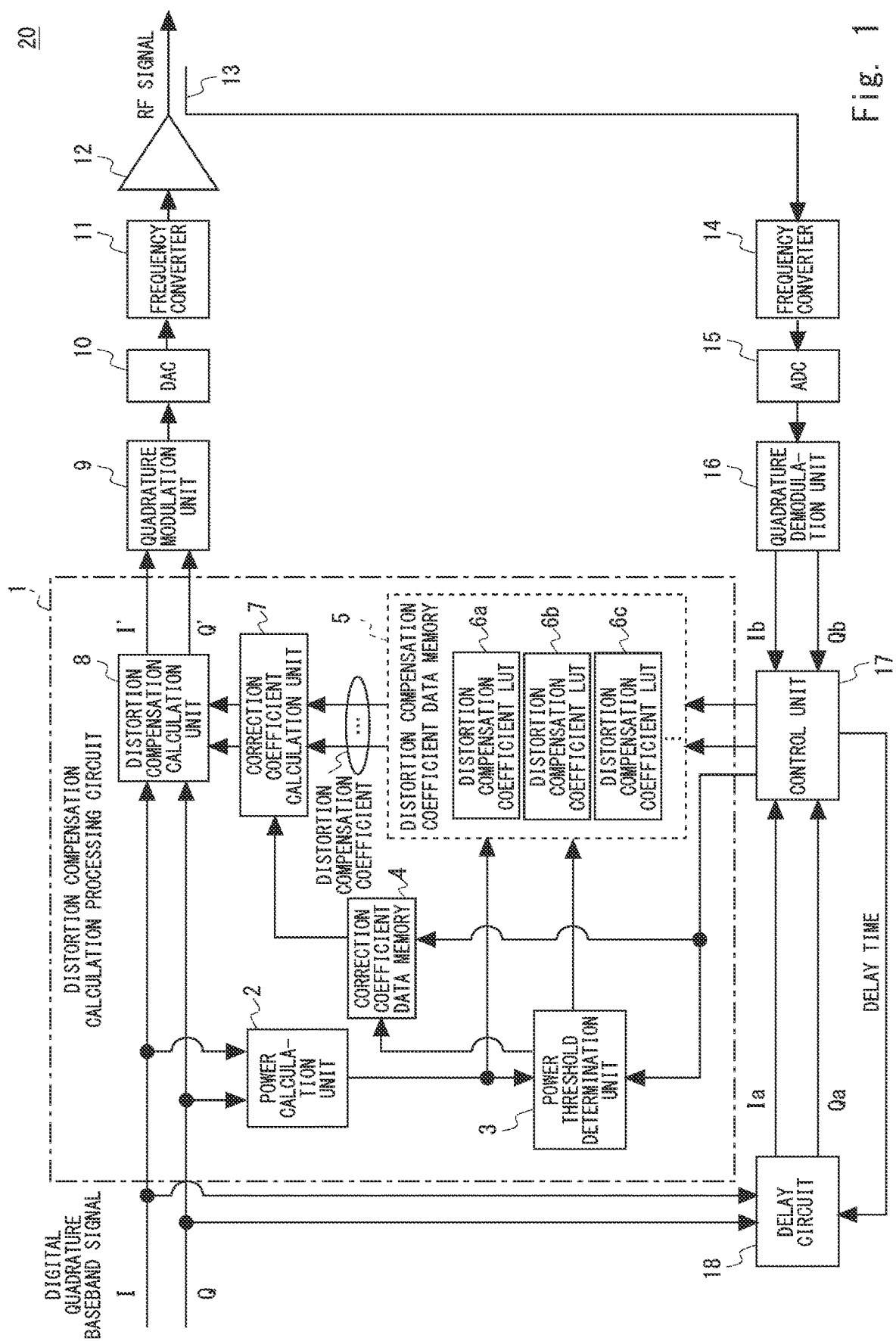
FIG. 1 shows an example of a configuration of a radio communication apparatus according to an example embodiment.

FIG. 1 shows an example of a configuration of a radio communication apparatus 20 according to an example embodiment. In the example shown in FIG. 1, the radio communication apparatus 20 according to the example embodiment includes a distortion compensation unit 1, a quadrature modulation unit 9, a DAC (Digital to Analog Converter) 10, a frequency converter 11, a power amplifier 12, a directional coupler 13, a frequency converter 14, an ADC (Analog to Digital Converter) 15, a quadrature demodulation unit 16, a control unit 17, and a delay circuit 18.

The distortion compensation unit 1 compensates for a distortion caused by the nonlinear characteristics of the power amplifier 12 when the radio communication apparatus 20 starts radio transmission (when a signal is turned on) based on the length of an immediately preceding signal Off time (the length of a section (i.e., a period) during which the signal has been Off when the signal is switched from Off to On). The distortion compensation unit 1 may compensate for the distortion caused by the nonlinear characteristics of the power amplifier 12 when the length of the immediately preceding signal Off time is a first time length, based on a distortion compensation coefficient representing the inverse characteristics of the nonlinear characteristics of the power amplifier 12, which are calculated based on a transmission signal input to the power amplifier 12 and a feedback signal obtained by feeding back a signal output from the power amplifier 12 when the length of the signal Off time was equal to the first time length in the past.

The distortion compensation unit 1 may compensate for the distortion based on a continuously changing distortion compensation coefficient. In this case, the distortion compensation unit 1 may compensate for the distortion based on a first distortion compensation coefficient in a first period that starts upon turning on of a signal. Then, the distortion compensation unit 1 may compensate for the distortion based on a distortion compensation coefficient that changes from the first distortion compensation coefficient to a second distortion compensation coefficient according to the transition of the time in a period from the first period to a second period. Then, the distortion compensation unit 1 may compensate for the distortion based on the second distortion compensation coefficient in the second period during which the nonlinear characteristics of the power amplifier 12 are different from those in the first period.

In the example shown in FIG. 1, the distortion compensation unit 1 is implemented by a circuit such as an FPGA (Field Programmable Gate Array) and an ASIC (Application Specific Integrated Circuits). In the example shown in FIG. 1, the distortion compensation unit 1 includes a power calculation unit 2, a power threshold determination unit 3, a correction coefficient data memory 4, a distortion compensation coefficient data memory 5, a distortion compensation coefficient LUTs (Look-Up Tables) 6a, 6b, 6c, . . . (hereafter, when it is unnecessary to distinguish between them, they are simply referred to as the "distortion compensation coefficient LUT(s) 6"), a correction coefficient calculation unit 7, and a distortion compensation calculation unit 8.

The power calculation unit 2 calculates average power of digital quadrature baseband signals I and Q, and power for each sample. The power threshold determination unit 3 counts (i.e., measures) the length of a time during which the power for each sample is continuously equal to or lower than a threshold, and the length of a time during which the power for each sample is continuously equal to or higher than the threshold.

The correction coefficient data memory 4 stores a correction coefficient calculated in the control unit 17 and changes in the correction coefficient over time. Further, the correction coefficient data memory 4 selects a correction coefficient according to the length of the time during which the power is continuously equal to or lower than the threshold, counted by the power threshold determination unit 3, changes the correction coefficient according to the length of the time during which the power is continuously equal to or higher than the threshold, and outputs the changed correction coefficient.

The distortion compensation coefficient data memory 5 stores the distortion compensation coefficient LUT 6 corresponding to the power of the digital quadrature baseband signals I and Q, and switches the connection between the distortion compensation coefficient LUT 6 and the correction coefficient calculation unit 7 according to the length of the time during which the power is continuously equal to or lower than the threshold, determined by the power threshold determination unit 3.

The distortion compensation coefficient LUT 6 is a LUT in which the distortion compensation coefficient calculated by the control unit 17 is recorded. The distortion compensation coefficient LUT 6 outputs the distortion compensation coefficient according to the power calculated by the power calculation unit 2.

The correction coefficient calculation unit 7 performs a correction calculation based on the distortion compensation coefficient read from the distortion compensation coefficient LUT 6 selected by the distortion compensation coefficient data memory 5 and the correction coefficient selected by the correction coefficient data memory 4, and outputs the result of the calculation to the distortion compensation calculation unit 8.

The distortion compensation calculation unit 8 performs a distortion compensation calculation for the digital quadrature baseband signals I and Q based on distortion compensation coefficients CI and CQ provided from the correction coefficient calculation unit 7. The quadrature modulation unit 9 quadrature-modulates the digital quadrature baseband signals I' and Q' for which the distortion compensation calculation has been performed by the distortion compensation calculation unit 8, and thereby converts them into digital IF signals.

The DAC 10 converts the digital IF signals converted by the quadrature modulation unit 9 from the digital signals into analog signals, and thereby generates analog IF (Intermediate Frequency) signals. The frequency converter 11 up-converts the analog IF signals converted by the DAC 10 into RF (Radio Frequency) signals.

(Regarding Power Amplifier 12)

The power amplifier 12 amplifies the power of an RF signal and outputs the RF signal having the amplified power. An RF signal is input to the power amplifier 12 when data is wirelessly transmitted from the radio communication apparatus 20. Therefore, the RF signal input to the power amplifier 12 is turned on, in a period in which data can be transmitted in a TDD method, only during a period in which data is actually transmitted. The radio communication apparatus 20 may control the On/Off of the RF signal input to the power amplifier 12, in the period in which data can be transmitted in the TDD method, according to the amount of transmission data. This technology is also referred to as, for example, micro-sleep or the like, and the power consumption can be reduced by this technology. The power amplifier 12 may include a transistor(s) using gallium nitride (GaN).

Note that, in power amplifiers 12 for base stations and the like for mobile communications in recent years, transistors that use gallium nitride (GaN) for achieving high power and high efficiency are often adopted. However, GaN transistors are characterized in that they have a current collapse phenomenon. The current collapse phenomenon is a phenomenon which is caused as electrons are trapped in areas where a strong electric field is applied, such as an area between the source and the drain, an area between the source and the gate, and an area between the drain and the substrate, when the device is in an off-state, and in which when the amount of trapped electrons changes according to the length of the signal off-time, the on-resistance of the device and the time until the trapped electrons are released change.

Figure 2:
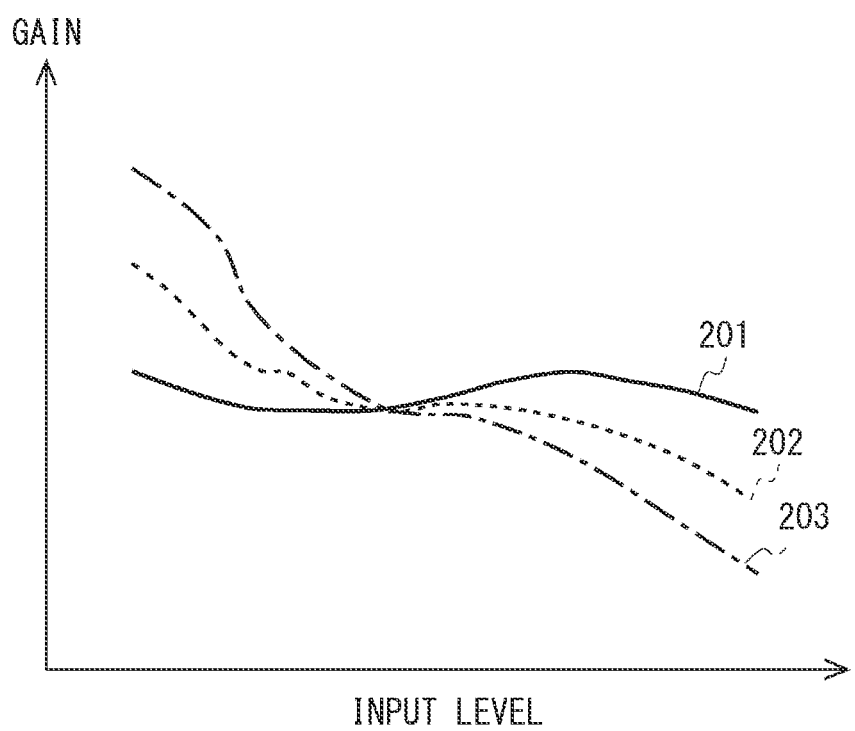
FIG. 2 shows an example of nonlinear characteristics of a power amplifier immediately after a signal is turned on by a current collapse phenomenon and in a state in which the On-state continues.
Figure 3:
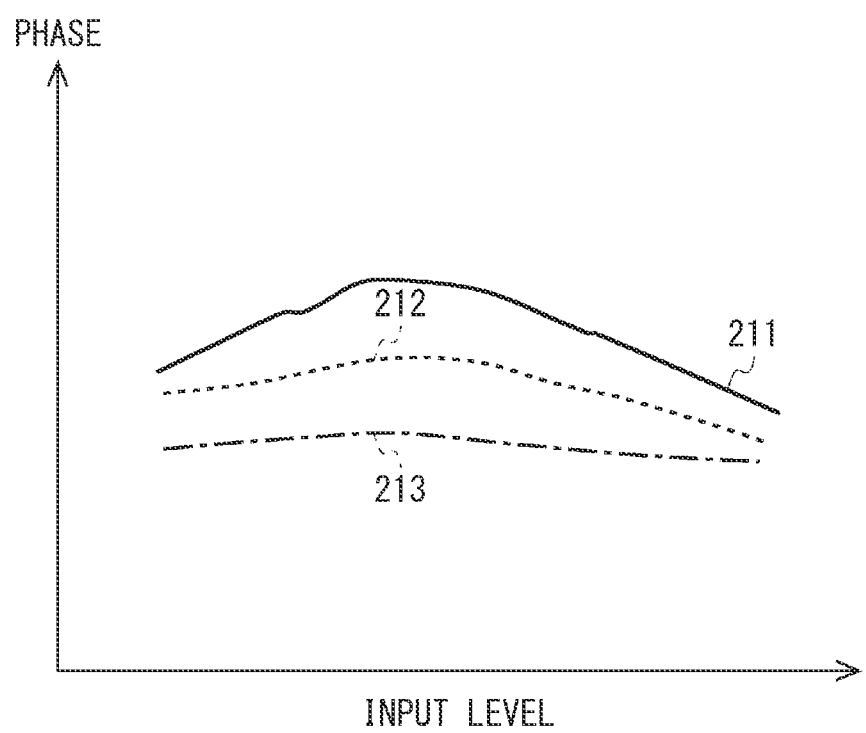
FIG. 3 shows an example of nonlinear characteristics of a power amplifier immediately after a signal is turned on by a current collapse phenomenon and in a state in which the On-state continues.

FIGS. 2 and 3 show examples of nonlinear characteristics of a power amplifier, which are caused by a current collapse phenomenon, immediately after a signal is turned on (the start of radio transmission) and when the signal On-state continues (hereafter also referred to as a "stable state" as appropriate). FIG. 2, in which the horizontal axis indicates the input level and the vertical axis indicates the gain, shows examples of a value 201 in a stable state, a value 202 immediately after a signal is turned on when the length of the immediately preceding signal Off time is relatively short, and a value 203 immediately after a signal is turned on when the length of the immediately preceding signal Off time is relatively long. Further, FIG. 3, in which the horizontal axis indicates the input level and the vertical axis indicates the phase, shows examples of a value 211 in a stable state, a value 212 immediately after a signal is turned on when the length of the immediately preceding signal Off time is relatively short, and a value 213 immediately after a signal is turned on when the length of the immediately preceding signal Off time is relatively long. As shown in FIGS. 2 and 3, the nonlinear characteristics of the power amplifier immediately after a signal is turned on are significantly different from those in the stable state because of the occurrence/absence of a current collapse phenomenon.

Figure 4:
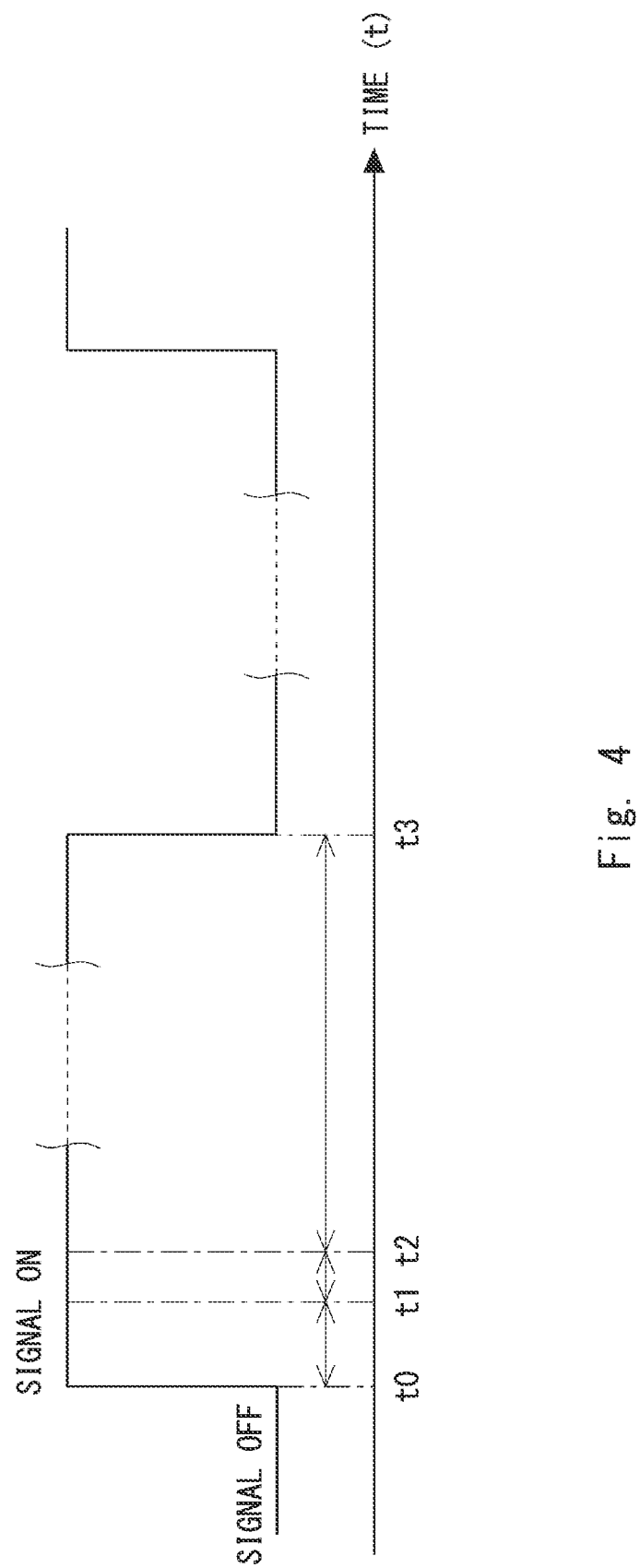
FIG. 4 shows an example of signal On/Off timings, a state immediately after a signal is turned on, and a stable state in a TDD method.

FIG. 4 shows an example of signal On/Off timings, a state immediately after a signal is turned on, and a stable state in a TDD method. In the example shown in FIG. 4, a time point at which the signal is turned on is represented by t0; a time point immediately after the signal is turned on is represented by t1; a time point in the stable state is represented by t2; and a time point at which the signal is switched from On to Off is represented by t3. For example, in a signal in an OFDM (Orthogonal Frequency Division Multiplex) modulation method adopted in downlinks in 4G and 5G, changes in the nonlinear characteristics of a certain power amplifier are as follows: a period from t0 to t1 contains 4 Symbols (≈256 μs); a period from t0 to t2 contains 5 Symbols (≈327 μs); and a period from t1 to t2 contains 1 Symbol (≈71 μs). Note that the timings t1 and t2 change according to the type of the power amplifier 12, the length of the signal Off time immediately before the signal is turned on, and the like.

In the 4G (4th Generation mobile communication system), a DL (downlink)/UL (uplink) switching pattern has a fixed repetition period of 10 msec. Therefore, since the value of the TDD timing is known and the length of the signal Off time is the same at every period (i.e., is unchanged irrespective of the period), the degree of the current collapse phenomenon is the same at every period (i.e., is unchanged irrespective of the period) and the nonlinearity immediately after the signal is turned on is also the same at every period (i.e., is unchanged irrespective of the period).

In contrast, in 5G (5th Generation mobile communication system) NR (New Radio), it is shown that Semi-static TDD and Dynamic TDD will be realized in the future. In the Semi-static TDD, a TDD timing can be set for each frame in a unit of 0.5, 0.625, 1, 1.25, 2, 2.5, 5 or 10 msec. In the Dynamic TDD, the DL/UL can be flexibly switched for each symbol as required without setting the repetition period of the DL/UL switching pattern. As a result, when the TDD timing is dynamically changed, the length of the immediately preceding signal Off time is changed every time the TDD timing is changed, and the degree of the current collapse phenomenon is also changed every time the TDD timing is changed, so that the change in the nonlinearity of the power amplifier 12 immediately after the signal is turned on is also changed every time the TDD timing is changed.

The directional coupler 13 feeds back a part of the output of the power amplifier 12 to the frequency converter 14. The frequency converter 14 down-converts RF signals fed back by the directional coupler 13 into analog IF signals. The ADC 15 converts the analog IF signals down-converted by the frequency converter 14 from the analog signal into digital signals, and thereby generates digital IF signals.

The quadrature demodulation unit 16 quadrature-demodulates the digital IF signals converted by the ADC 15, and thereby converts the digital IF signals into digital quadrature baseband feedback signals Ib and Qb. The delay circuit 18 delays the digital quadrature baseband signals I and Q by a set time, and outputs the delayed digital quadrature baseband signals to the control unit 17.

The control unit 17 calculates the delay times of the transmission signal and the feedback signal input to the control unit 17, i.e., the delay times of the digital quadrature baseband signals Ia and Qa and the digital quadrature baseband feedback signals Ib and Qb, and sets the calculated delay times in the delay circuit 18. Further, the control unit 17 also calculates a distortion compensation coefficient representing the inverse characteristics of the nonlinear characteristics of the power amplifier 12 that has been adjusted to those of a sample, and updates the distortion compensation coefficient recorded in the distortion compensation coefficient LUT 6 that meets the conditions with the calculated distortion compensation coefficient.

Note that the control unit 17 may compare, for example, the amplitude and the phase of the digital transmission signal input to the power amplifier 12 with those of the digital feedback signal obtained by feeding back the signal output from the power amplifier 12, and calculate the distortion compensation coefficient representing the inverse characteristics of the nonlinear characteristics of the power amplifier 12 based on the result of the comparison. The method for calculating the distortion compensation coefficient in the present disclosure is not limited to the above-described method, and other methods may be used. Further, the control unit 17 updates the correction coefficient that meets the conditions, and the times at which the correction coefficient has been changed.

<Processing (Operation)>

Figure 5:
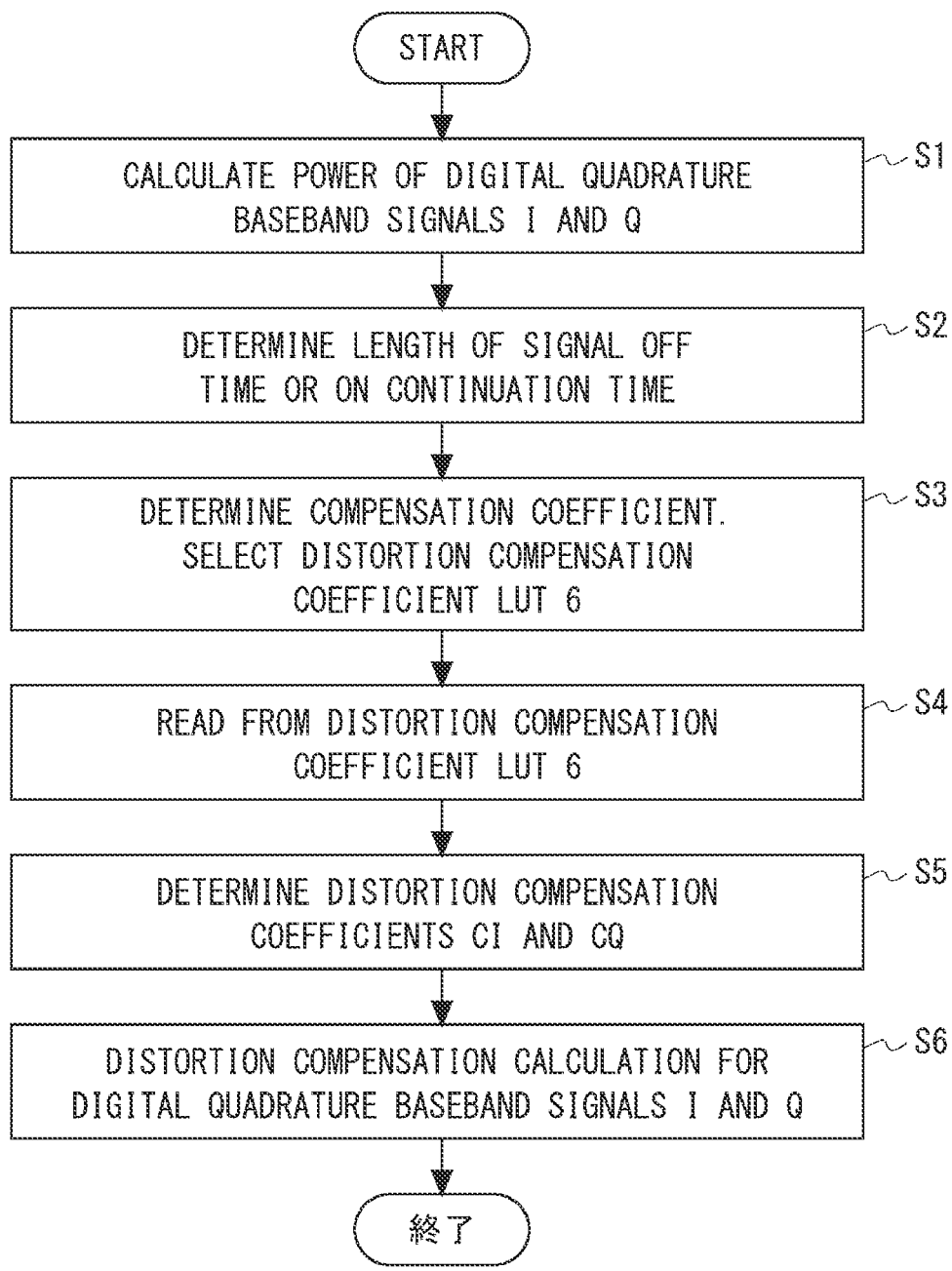
FIG. 5 is a flowchart showing an example of a distortion compensation process performed by a radio communication apparatus according to an example embodiment.
Figure 6:
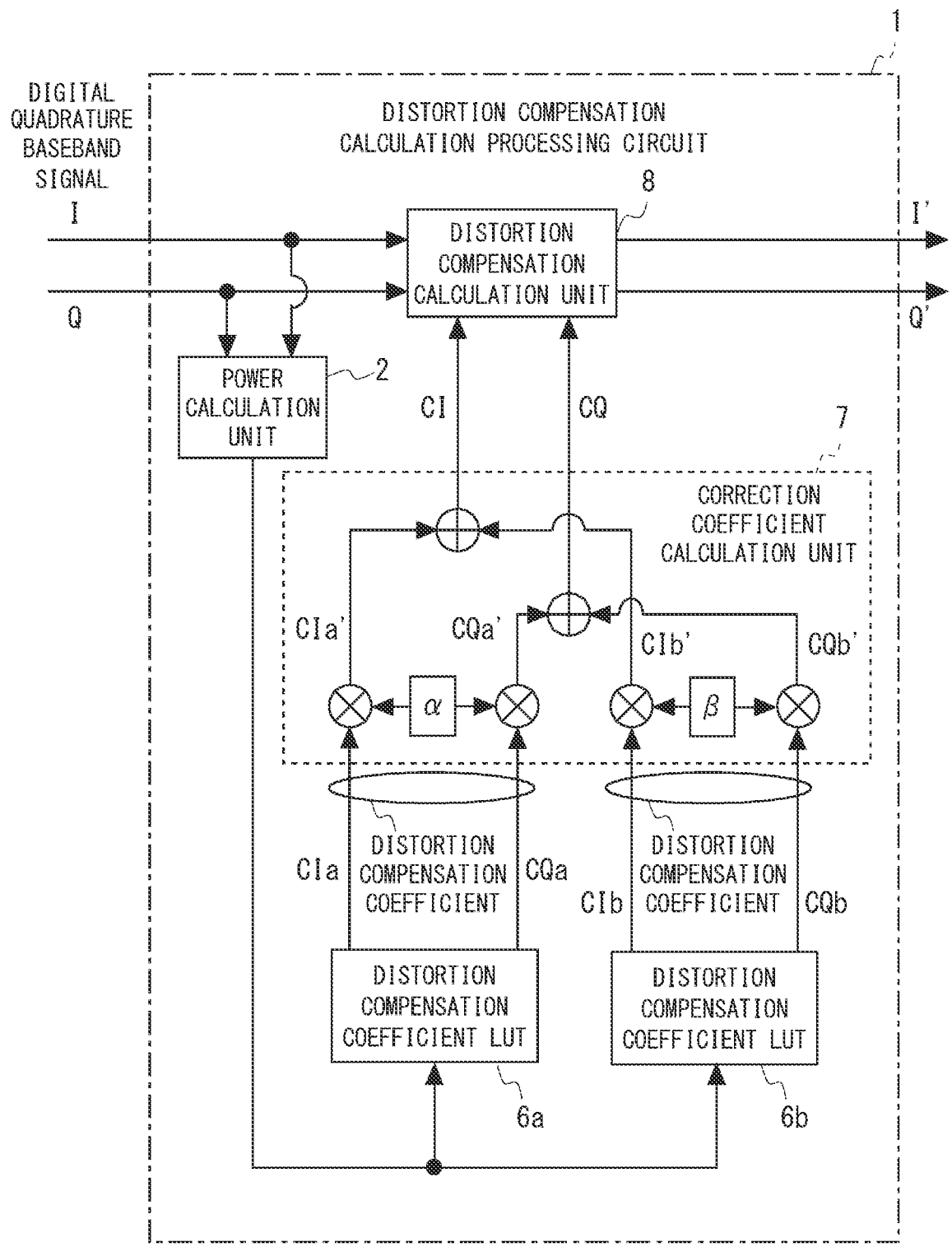
FIG. 6 shows an example of a configuration of a distortion compensation unit according to an example embodiment.
Figure 7:
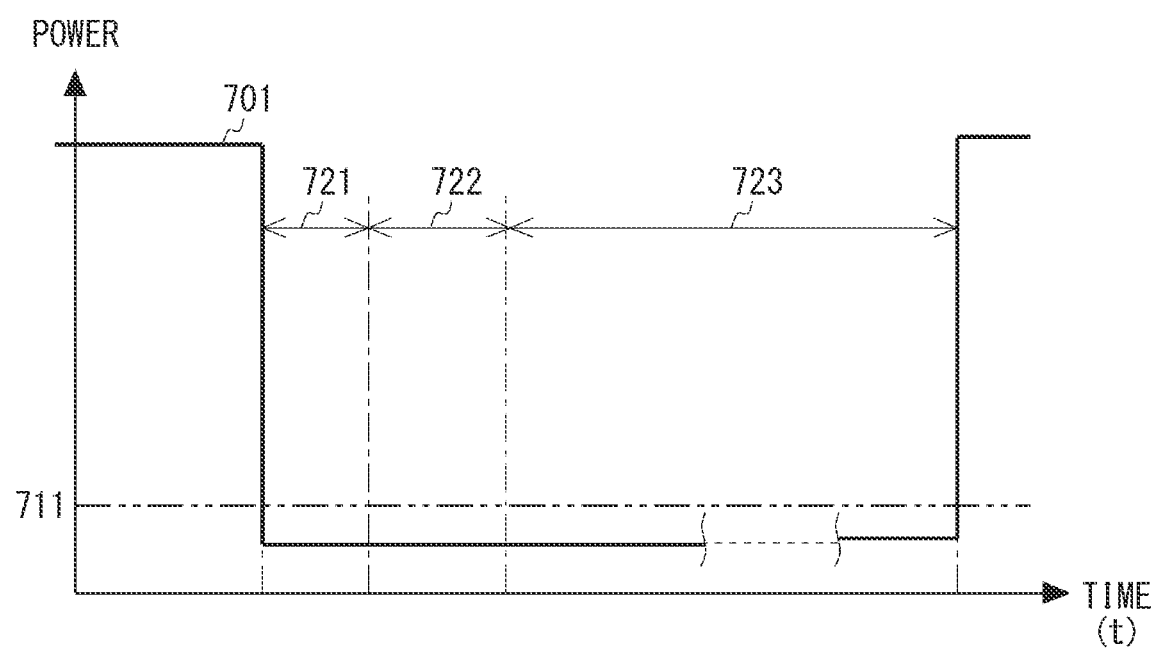
FIG. 7 shows an example of a method for determining a distortion compensation coefficient and a correction coefficient according to the length of the immediately preceding signal Off time according to an example embodiment.
Figure 9:
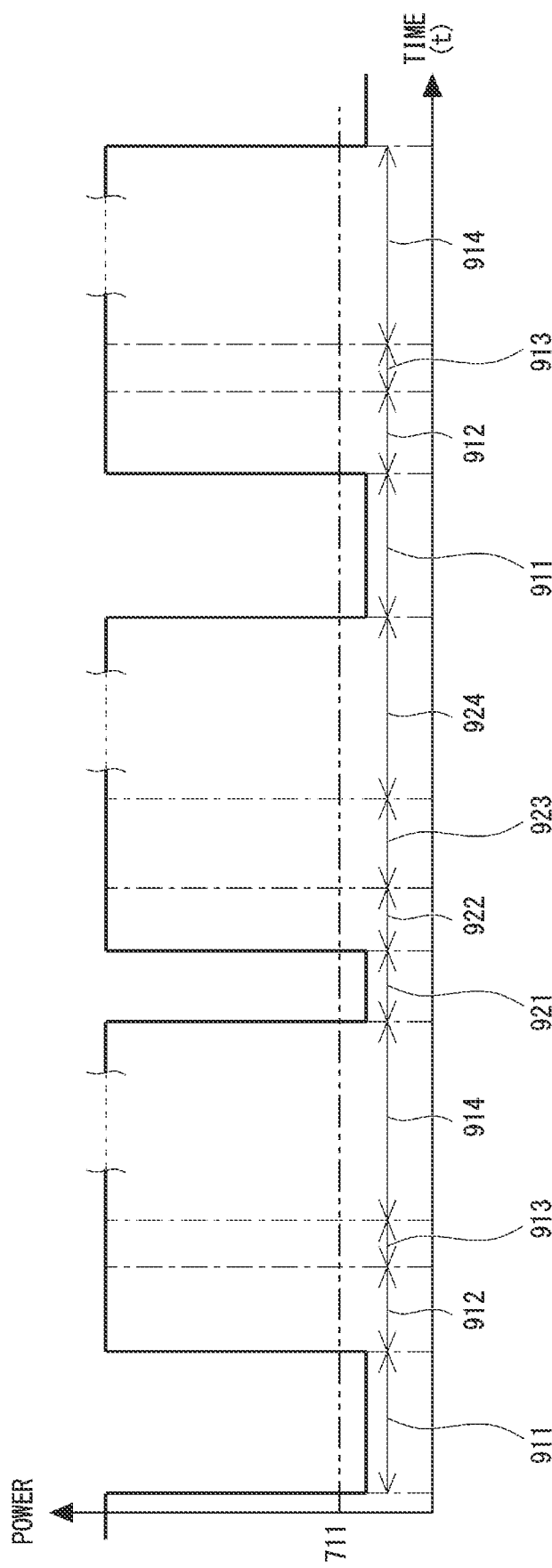
FIG. 9 shows an example in which a distortion compensation coefficient and a correction coefficient are selected according to the length of the immediately preceding signal Off time according to an example embodiment.
Figure 10:
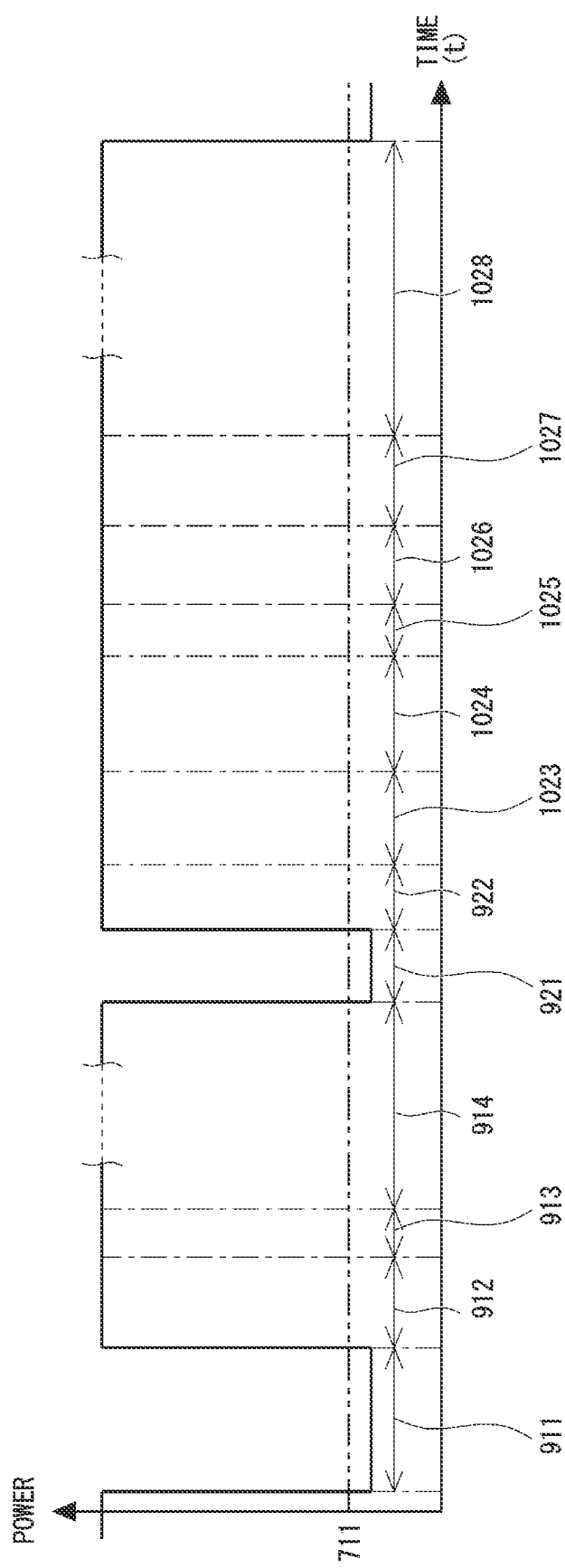
FIG. 10 shows an example in which a distortion compensation coefficient and a correction coefficient are selected according to the length of the immediately preceding signal Off time according to an example embodiment.

Next, an example of a distortion compensation process performed by the radio communication apparatus 20 according to the example embodiment will be described with reference to FIGS. 5 to 10. FIG. 5 is a flowchart showing an example of the distortion compensation process performed by the radio communication apparatus 20 according to the example embodiment. FIG. 6 shows an example of the configuration of the distortion compensation unit 1 according to the example embodiment. FIG. 7 shows an example of a method for determining a distortion compensation coefficient and a correction coefficient according to the length of the immediately preceding signal Off time according to the example embodiment. FIG. 8 shows an example of changes in a correction coefficient α over time according to the example embodiment. FIG. 9 shows an example in which a distortion compensation coefficient and a correction coefficient are selected according to the length of the immediately preceding signal Off time according to the example embodiment. FIG. 10 shows an example in which a distortion compensation coefficient and a correction coefficient are selected according to the length of the immediately preceding signal Off time according to the example embodiment. Note that the radio communication apparatus 20 may perform the below-shown process at each time point while, for example, it is performing communication (transmission or reception) in a TDD method.

In a step S1, the power calculation unit 2 calculates the power of the digital quadrature baseband signals I and Q. Next, the power threshold determination unit 3 determines, based on the result of the measurement by the power calculation unit 2, the length of the immediately preceding signal Off time, the time point at which the signal is turned on, and the time point at which the signal is stabilized (Step S2). Note that the power threshold determination unit 3 may calculate, as the length of the signal Off time, for example, the length of a time during which the measured power for each sample continues to be equal to or lower than a threshold (a power value that is regarded as signal-Off, e.g., 0W). The power threshold determination unit 3 may determine, as the time point at which the signal is stabilized, for example, the time point at which the length of the time during which the measured power continues to be higher than the threshold exceeds a specific length.

Next, the correction coefficient data memory 4 changes (determines) the correction coefficient α at a preset timing according to the length of the time determined by the power threshold determination unit 3, and the distortion compensation coefficient data memory 5 selects a distortion compensation coefficient LUT 6 according to the length of the time determined by the power threshold determination unit 3 (Step S3). Next, a distortion compensation coefficient associated with the power value calculated by the power calculation unit 2 is read from the distortion compensation coefficient LUT 6 (Step S4). Next, the correction coefficient calculation unit 7 determines distortion compensation coefficients CI and CQ (Step S5).

The correction coefficient data memory 4, the distortion compensation coefficient data memory 5, and the correction coefficient calculation unit 7 may perform compensation based on a first distortion compensation coefficient in a first period that starts upon turning on of the signal. Then, in a period from the first period to a second period, they may perform compensation based on the distortion compensation coefficient that changes from the first distortion compensation coefficient to a second distortion compensation coefficient according to the transition of the time. Then, they may perform compensation based on the second distortion compensation coefficient in the second period in which the nonlinear characteristics of the power amplifier 12 are different from those in the first period.

In the example shown in FIG. 6, in a distortion compensation coefficient LUT 6a, a distortion compensation coefficient representing the inverse characteristics of the nonlinear characteristics of the power amplifier 12 immediately after the signal is turned on when the length of the immediately preceding signal Off time is equal to a specific length is recorded, and in a distortion compensation coefficient LUT 6b, a distortion compensation coefficient representing the inverse characteristics of the nonlinear characteristics of the power amplifier 12 in the stable state is recorded. Note that the initial value of the distortion compensation coefficient recorded in the distortion compensation coefficient LUT 6 may be set in advance.

FIG. 7 shows an example of a method for selecting a distortion compensation coefficient LUT 6 and a correction coefficient according to the length of the immediately preceding signal Off time when the distortion compensation unit 1 has the circuit configuration shown in FIG. 6. In a section (a period) 721 after power 701 becomes equal to or lower than a threshold value 711, a distortion compensation coefficient LUT 6a, a distortion compensation coefficient LUT 6b, and a correction coefficient α0 are selected.

In a section 722 following the section 721, a distortion compensation coefficient LUT 6c, the distortion compensation coefficient LUT 6b, and a correction coefficient α1 are selected. In a section 723 following the section 722, a distortion compensation coefficient LUT 6d, the distortion compensation coefficient LUT 6b, and a correction coefficient α2 are selected. Note that if the power becomes larger than the threshold during the process, they are fixed at the selected distortion compensation LUT and the selected correction coefficient until the power becomes equal to or lower than the threshold 711 again. By selecting the distortion compensation coefficient and the correction coefficient when the signal is Off as described above, the distortion compensation coefficient LUT 6 can be switched continuously (smoothly) without discontinuity (i.e., interruption).

The correction coefficient calculation unit 7 regards (or defines) the distortion compensation coefficients read from the distortion compensation coefficient LUT 6a as distortion compensation coefficients CIa and CQa, regards the distortion compensation coefficients read from the distortion compensation coefficient LUT 6b as distortion compensation coefficients CIb and CQb, regards the distortion compensation coefficients for which the correction calculation has been performed as distortion compensation coefficients CI and CQ, and regards the correction coefficient read from the correction coefficient data memory 4 as a correction coefficient α. In this case, the correction coefficient calculation unit 7 may perform a correction calculation according to the below-shown Expressions 1 and 2.

$$CI = \alpha \times CIa + (1-\alpha) \times CIb \quad (1)$$

$$CQ = \alpha \times CQa + (1-\alpha) \times CQb \quad (2)$$

Note that the correction coefficient α is a coefficient that changes with time, and may change, for example, as shown in FIG. 8. In the example shown in FIG. 8, the correction coefficient α is 1.0 (α=1.0) in a section from t0 to t1 in FIG. 4; the correction coefficient α changes from 1.0 to 0.0 in a stepwise manner (continuously, over time) in a section from t1 to t2 (continuous, over time); and the correction coefficient α becomes 0.0 (α=0.0) in a section from t2 to t3.

As a result, the distortion compensation coefficients CI and CQ after the correction calculation become as follows: they are expressed by the below-shown Expression 3 for the section from t0 to t1; they are expressed by the below-shown Expression 4 for the section from t1 to t2; and they are expressed by the below-shown Expression 5 for the section from t2 to t3.

$$CI = CIa, \ CQ = CQa \quad (3)$$

$$CI = \alpha \times CIa + (1-\alpha) \times CIb, \ CQ = \alpha \times CQa + (1-\alpha) \times CQb \quad (4)$$

$$CI = CIb, \ CQ = CQb \quad (5)$$

In this way, it is possible to apply, at each timing, a distortion compensation coefficient corresponding to the nonlinear characteristics at that timing. Further, even if the distortion compensation coefficient LUT 6a is completely different from the distortion compensation coefficient LUT 6b, because the averaging processing with weighting by the correction coefficient has been performed for the switching of the LUT, a sudden change in the compensation coefficient, which would otherwise occur due to the LUT switching, does not occur, and the discontinuity of the signal is reduced, thus making it possible to suppress the deterioration of the spectrum and the unnecessary spurious effect.

FIG. 9 shows an example in which a distortion compensation coefficient and a correction coefficient are selected according to the length of the immediately preceding signal Off time. In the example shown in FIG. 9, in a section 912 immediately after the signal is turned on, a value recorded in the distortion compensation coefficient LUT 6a corresponding to the length of the time of a section 911 during which the power becomes equal to or lower than the threshold is used as the distortion compensation coefficient. Further, in a section 913 between the section 912 and a section 914 in the stable state, the distortion compensation coefficient is successively switched from a value in the distortion compensation coefficient LUT 6a to a value in the distortion compensation coefficient LUT 6b. Further, in the section 914 in the stable state, a value recorded in the distortion compensation coefficient LUT 6b is used as the distortion compensation coefficient.

Further, in a section 922 immediately after the signal is turned on, a value recorded in the distortion compensation coefficient LUT 6c corresponding to the length of the time of a section 921 during which the power becomes equal to or lower than the threshold is used as the distortion compensation coefficient. Further, in a section 923 between the section 922 and a section 924 in the stable state, the distortion compensation coefficient is successively switched from a value in the distortion compensation coefficient LUT 6c to a value in the distortion compensation coefficient LUT 6b. Further, in the section 924 in the stable state, similarly to the section 914, a value recorded in the distortion compensation coefficient LUT 6b is used as the distortion compensation coefficient.

Note that when the nonlinearity of the power amplifier 12 changes from one section to another even in the stable state, a different distortion compensation coefficient LUT 6 may be used for each of the sections as shown in FIG. 10. In the example shown in FIG. 10, in a section 922 immediately after the signal is turned on, a value recorded in the distortion compensation coefficient LUT 6c corresponding to the length of the time of a section 921 during which the power becomes equal to or lower than the threshold is used as the distortion compensation coefficient. Further, in a section 1023 between the section 922 and a first section 1024 in the stable state, the distortion compensation coefficient is successively switched from a value in the distortion compensation coefficient LUT 6c to a value in the distortion compensation coefficient LUT 6d. Further, in the first section 1024 in the stable state, a value recorded in the distortion compensation coefficient LUT 6d is used as the distortion compensation coefficient.

Further, in a section 1025 between the section 1024 and a second section 1026 in the stable state, the distortion compensation coefficient is successively switched from a value in the distortion compensation coefficient LUT 6d to a value in the distortion compensation coefficient LUT 6e. Further, in the second section 1026 in the stable state, a value recorded in the distortion compensation coefficient LUT 6e is used as the distortion compensation coefficient. Further, in the section 1027 between the section 1026 and a third section 1028 in the stable state, the distortion compensation coefficient is successively switched from a value in the distortion compensation coefficient LUT 6e to a value in the distortion compensation coefficient LUT 6f. Further, in the third section 1028 in the stable state, a value recorded in the distortion compensation coefficient LUT 6f is used as the distortion compensation coefficient.

Note the calculation performed by the correction coefficient calculation unit 7 is not limited to those performed according to the above-described Expressions 1 and 2, and CI and CQ may be continuously changed by, for example, a root-mean-square calculation or the like.

Next, the distortion compensation calculation unit 8 performs a distortion compensation calculation for the digital quadrature baseband signals I and Q based on the distortion compensation coefficients CI and CQ (Step S6). In this way, the distortion caused by the nonlinear characteristics of the power amplifier 12 is compensated for based on the length of the immediately preceding signal Off time. Further, for example, even when the nonlinear characteristics of the power amplifier 12 significantly change only immediately after the signal is turned on in the TDD method, it is possible to suppress the deterioration of the spectrum and the unnecessary spurious, and thereby to perform accurate distortion compensation in the whole transmission sections. Further, in the Semi-static TDD or the Dynamic TDD in which the TDD pattern dynamically changes, even when the nonlinear characteristics of the power amplifier immediately after the signal is turned on in the TDD method significantly change every time the signal is turned on, it is possible to perform accurate distortion compensation.

(Regarding Update of Data in Distortion Compensation Coefficient LUT 6)

The control unit 17 may calculate, based on the transmission signal input to the power amplifier 12 for the length of a specific signal Off time and the feedback signal obtained by feeding back the signal output from the power amplifier 12, a distortion compensation coefficient representing the inverse characteristics of the nonlinear characteristics of the power amplifier 12 for the length of the specific signal Off time. Then, the control unit 17 may record the calculated distortion compensation coefficient in the distortion compensation coefficient LUT 6 for the length of the specific signal Off time. In this way, for example, it is possible to update, for each of lengths of signal Off times, the distortion compensation coefficient LUT 6 corresponding to that length of the signal Off time based on an actually measured value(s), and thereby to perform more accurate distortion compensation.

For example, assume that, in a case where the length of the signal Off time immediately before a signal is turned on in a TDD method is 2 ms, a distortion compensation coefficient representing the inverse characteristics of the nonlinear characteristics of the power amplifier 12 immediately after signal is turned on is stored in the distortion compensation coefficient LUT 6a. Further, assume that a distortion compensation coefficient representing the inverse characteristics of the nonlinear characteristics of the power amplifier 12 in the stable state is recorded in the distortion compensation coefficient LUT 6b.

In this case, the control unit 17 may calculate, in the case where the signal-Off section immediately before the signal is tuned on is 2 ms, a distortion compensation coefficient representing the inverse characteristics of the nonlinear characteristics of the power amplifier 12 in a section immediately after the signal is turned on based on the transmission signal and the feedback signal in the section immediately after the signal is turned on. Then, the control unit 17 may update the distortion compensation coefficient in the distortion compensation coefficient LUT 6a with the calculated value.

Further, the control unit 17 may calculate, in the case where the signal-Off section immediately before the signal is tuned on is 2 ms, a distortion compensation coefficient representing the inverse characteristics of the nonlinear characteristics of the power amplifier 12 in a section in the stable state based on the transmission signal and the feedback signal in the stable state. Then, the control unit 17 may update the distortion compensation coefficient in the distortion compensation coefficient LUT 6b with the calculated value.

Modified Example

Figure 11:
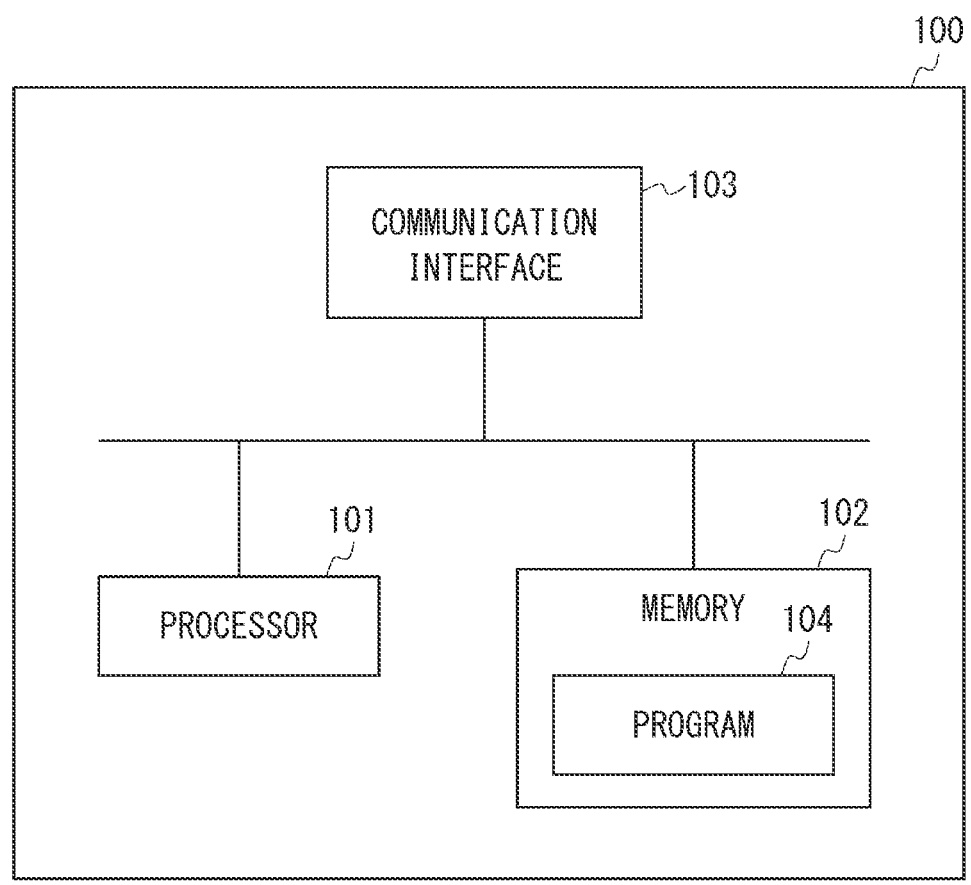
FIG. 11 shows an example of, when at least a part of a radio communication apparatus according to an example embodiment is implemented by a computer and a program, a configuration of the computer.

FIG. 11 shows an example of, when at least a part (e.g., a distortion compensation unit 1) of a radio communication apparatus 20 according to an example embodiment is implemented by a computer and a program, a configuration of the computer 100. In the example shown in FIG. 11, the computer 100 includes a processor 101, a memory 102, and a communication interface 103. These components may be connected to each other through a bus or the like. The memory 102 stores at least a part of a program 104. The communication interface 103 includes an interface necessary for communicating with other network elements.

When the program 104 is executed through the cooperation of the processor 101, the memory 102, and the like, at least one of the processes of the example embodiment according to the present disclosure is performed by the computer 100. The memory 102 may be of any type of memory suitable for a local technology network. Further, the memory 102 may be of any type suitable for a local technology network, and may be implemented by using any suitable data storage technology, such as, as a non-limiting example, a non-transitory computer readable storage medium, a semiconductor-based memory device, a magnetic memory device and system, an optical memory device and system, a fixed memory, and a removable memory. Although only one memory 102 is provided in the computer 100, a plurality of physically different memory modules may be provided in the computer 100. The processor 101 may be of any type suitable for a local technology network, and examples thereof may include a general-purpose computer, a dedicated computer, a microprocessor, a digital signal processor (DSP: Digital Signal Processor), and, as a non-limiting example, at least one processor based on a multicore processor architecture. The computer 100 may include a plurality of processors, such as an application-specific integrated circuit chip that is temporally dependent on a clock for synchronizing the main processor.

An example embodiment according to the present disclosure may be implemented by hardware, a dedicated circuit, software, a logic, or any combination thereof. In some aspects, an example embodiment may be implemented by hardware, while in other aspects, an example embodiment may be implemented by firmware or software that may be executed by a controller, a microprocessor, or other computing devices.

The present disclosure also provides at least one computer program product that is tangibly stored in a non-transitory computer readable storage medium. The computer program product contains computer executable instructions, such as those contained in program modules, and is executed by a target real processor or by a device on a virtual processor, so that a process(es) or a method according to the present disclosure is performed. The program module contains routines, programs, libraries, objects, classes, components, and data structures for performing specific tasks or implement specific abstract data types. The functions of the program module may be combined with those of the other program modules, or divided into a plurality of program modules as desired in various example embodiments. The machine executable instructions in the program module can be executed locally or in a distributed device(s). In the distributed device, the program module can be disposed on both local and remote storage media.

The program codes for performing the method according to the present disclosure may be written in any combination of at least one programming language. These program codes are provided to a processor or a controller of a general-purpose computer, a dedicated computer, or other programmable data processing apparatuses, and when such a program code is executed by the processor or the controller, a function/operation in a flowchart and/or a block diagram to be implemented is executed. The program code is entirely executed in a machine, partially executed in a machine as a standalone software package, partially executed in a machine, partially executed in a remote machine, or entirely executed in a remote machine or a server.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Each of the above-described example embodiments can be combined as desirable by one of ordinary skill in the art.

Note that the present invention is not limited to the above-described example embodiments, and they may be modified as appropriate without departing from the scope and spirit of the invention.

While the disclosure has been particularly shown and described with reference to example embodiments thereof, the disclosure is not limited to these example embodiments. It will be understood by those of ordinary skill in the art that various changes in form and details may be made therein without departing from the spirit and scope of the present disclosure as defined by the claims.

The whole or part of the example embodiments disclosed above can be described as, but not limited to, the following supplementary notes.

(Supplementary Note 1)

A radio communication apparatus comprising:
 a power amplifier configured to amplify power of a signal and output the signal having the amplified power; and
 a distortion compensation unit configured to compensate for a distortion caused by a nonlinear characteristic of the power amplifier based on a length of an immediately preceding signal Off time.

(Supplementary Note 2)

The radio communication apparatus described in Supplementary note 1, wherein the distortion compensation unit compensates for the distortion caused by the nonlinear characteristic of the power amplifier when the length of the immediately preceding signal Off time is a first time length, based on a distortion compensation coefficient representing an inverse characteristic of the nonlinear characteristic of the power amplifier, the inverse characteristic being calculated based on a transmission signal input to the power amplifier and a feedback signal obtained by feeding back a signal output from the power amplifier when the length of the signal Off time was equal to the first time length in the past.

(Supplementary Note 3)

The radio communication apparatus described in Supplementary note 1 or 2, wherein the distortion compensation unit compensates for the distortion caused by the nonlinear characteristic of the power amplifier when the radio communication apparatus starts radio transmission based on the length of the immediately preceding signal Off time.

(Supplementary Note 4)

The radio communication apparatus described in Supplementary note 1 or 2, wherein the power amplifier comprises a transistor using gallium nitride (GaN).

(Supplementary Note 5)

The radio communication apparatus described in Supplementary note 1 or 2, wherein the distortion compensation unit:
 compensates for the distortion based on a first distortion compensation coefficient in a first period that starts upon turning on of a signal;
 compensates for the distortion based on a distortion compensation coefficient that changes from the first distortion compensation coefficient to a second distortion compensation coefficient according to the transition of the time in a period from the first period to a second period; and
 compensates for the distortion based on the second distortion compensation coefficient in the second period during which the nonlinear characteristic of the power amplifier is different from that in the first period.

(Supplementary Note 6)

A method comprising compensating, by a radio communication apparatus, for a distortion caused by a nonlinear characteristic of a power amplifier based on a length of an immediately preceding signal Off time, the power amplifier being configured to amplify power of a signal and output the signal having the amplified power.

(Supplementary Note 7)

A program for causing a computer to perform a process for compensating for a distortion caused by a nonlinear characteristic of a power amplifier based on a length of an immediately preceding signal Off time, the power amplifier being configured to amplify power of a signal and output the signal having the amplified power.

What is claimed is:

1. A radio communication apparatus comprising:
 a power amplifier configured to amplify power of a signal and output the signal having the amplified power; and
 a distortion compensation unit configured to compensate for a distortion caused by a nonlinear characteristic of the power amplifier based on a length of an immediately preceding signal Off time, wherein the distortion compensation unit is configured to compensate for the distortion caused by the nonlinear characteristic of the power amplifier when the length of the immediately preceding signal Off time is a first time length, based on a distortion compensation coefficient representing an inverse characteristic of the nonlinear characteristic of the power amplifier, the inverse characteristic being calculated based on a transmission signal input to the power amplifier and a feedback signal obtained by feeding back a signal output from the power amplifier when the length of the signal Off time was equal to the first time length in the past.

2. The radio communication apparatus according to claim 1, wherein the distortion compensation unit is configured to compensate for the distortion caused by the nonlinear characteristic of the power amplifier when the radio communication apparatus starts radio transmission based on the length of the immediately preceding signal Off time.

3. The radio communication apparatus according to claim 1, wherein the power amplifier comprises a transistor using gallium nitride (GaN).

4. The radio communication apparatus according to claim 1, wherein the distortion compensation unit is configured to:
 compensate for the distortion based on a first distortion compensation coefficient in a first period that starts upon turning on of a signal;
 compensate for the distortion based on a distortion compensation coefficient that changes from the first distortion compensation coefficient to a second distortion compensation coefficient according to the transition of the time in a period from the first period to a second period; and compensate for the distortion based on the second distortion compensation coefficient in the second period during which the nonlinear characteristic of the power amplifier is different from that in the first period.

5. A method comprising:

compensating, by a radio communication apparatus, for a distortion caused by a nonlinear characteristic of a power amplifier when a length of an immediately preceding signal Off time is a first time length, based on a distortion compensation coefficient representing an inverse characteristic of the nonlinear characteristic of the power amplifier, the inverse characteristic being calculated based on a transmission signal input to the power amplifier and a feedback signal obtained by feeding back a signal output from the power amplifier when the length of the signal Off time was equal to the first time length in the past, the power amplifier being configured to amplify power of a signal and output the signal having the amplified power.

6. A non-transitory computer readable medium storing a program for causing a computer to perform processing comprising:

compensating for a distortion caused by a nonlinear characteristic of a power amplifier when a length of an immediately preceding signal Off time is a first time length, based on a distortion compensation coefficient representing an inverse characteristic of the nonlinear characteristic of the power amplifier, the inverse characteristic being calculated based on a transmission signal input to the power amplifier and a feedback signal obtained by feeding back a signal output from the power amplifier when the length of the signal Off time was equal to the first time length in the past, the power amplifier being configured to amplify power of a signal and output the signal having the amplified power.

* * * * *